United States Patent [19]

Stockburger et al.

[11] Patent Number: 4,582,986
[45] Date of Patent: Apr. 15, 1986

[54] METHOD AND APPARATUS FOR THE CHARACTERISTIC MARKING AND/OR IDENTIFICATION OF A DATA-CARRIER

[76] Inventors: Hermann Stockburger, Kirnachweg 7, 7742 St. Georgen; Hans-Georg Winderlich, Niedere Str. 36, 7730 VS-Villingen, both of Fed. Rep. of Germany

[21] Appl. No.: 395,004
[22] PCT Filed: Nov. 20, 1981
[86] PCT No.: PCT/DE81/00204
§ 371 Date: Jun. 28, 1982
§ 102(e) Date: Jun. 28, 1982
[87] PCT Pub. No.: WO82/01778
PCT Pub. Date: May 27, 1982

[30] Foreign Application Priority Data

Nov. 21, 1980 [DE] Fed. Rep. of Germany ....... 3043985

[51] Int. Cl.⁴ ........................... G06K 7/10; G06K 7/14
[52] U.S. Cl. .................... 235/454; 235/472; 235/487; 235/493
[58] Field of Search ............... 235/380, 385, 432, 435, 235/449, 454, 472, 487, 493

[56] References Cited

U.S. PATENT DOCUMENTS 4,218,674 8/1980 Brosow ...................... 340/825.34
4,423,415 12/1983 Goldman ........................... 235/454

FOREIGN PATENT DOCUMENTS 8100853 6/1980 PCT Int'l Appl. .

Primary Examiner—Harold I. Pitts
Attorney, Agent, or Firm—Donald Brown

[57] ABSTRACT

For the characteristic marking of a data-carrier, for example a cheque- or personal authorization card, its specific physical properties, e.g. optical properties, are scanned in a first data-carrier region, converted into characterizing data and recorded as an authenticity record on the data-carrier itself or in a processing station.

For subsequent authentication or authenticity identification of the data-carrier, its physical properties are scanned in a region thereof which comprises the region scanned for the characteristic marking process but is larger than this. The two sets of data derived from the said two scanned data-carrier regions are then mutually compared to trace points of coincidence by application of correlation-and signature-analysis-methods. For identification, or authenticity verification of the data-carrier the latter need no longer be lined up relative to the scanning device which scans its physical properties in precisely the same position as it was during the characteristic marking process.

12 Claims, 3 Drawing Figures

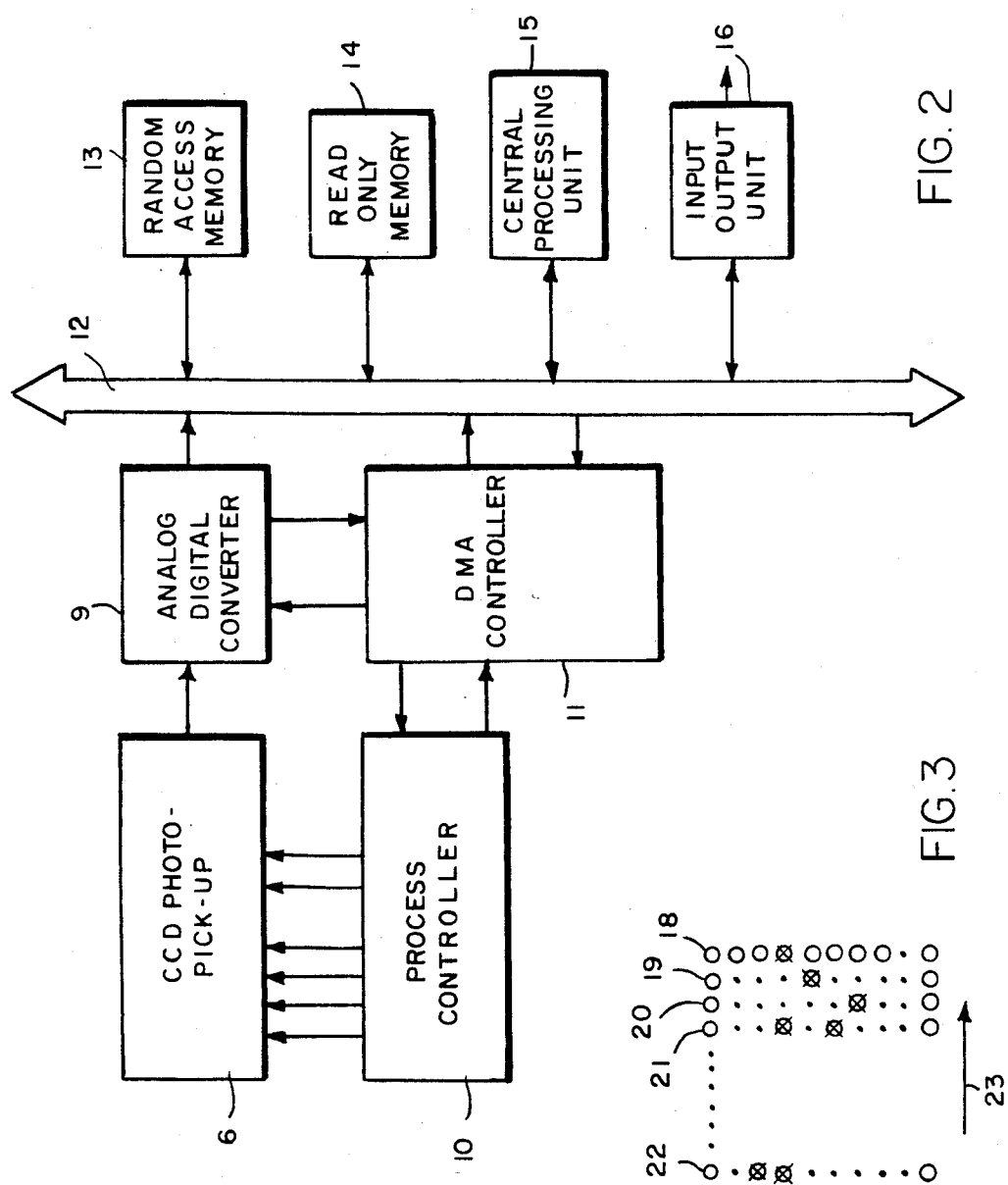

METHOD AND APPARATUS FOR THE CHARACTERISTIC MARKING AND/OR IDENTIFICATION OF A DATA-CARRIER

The invention relates to a method for the characteristic marking and/or identification of data-carriers which are inserted into a processing station for the purpose of being characteristically marked and identified, using data specifically characteristic of the data-carriers which are derived from individual physical properties thereof and logged in form of record traces which for data-carrier identification are compared with data derived from the scanned physical properties of the data carriers to be authenticated.

The invention further relates to apparatus for characteristically marking and identifying or authenticating a data-carrier, comprising a processing station in which the data-carrier is inserted for characteristic marking and identification and which comprises a scanner or detector device for scanning the physical data-carrier properties, and a store- or logging device which logs the data derived from the scanned physical properties in form of a record trace which, for data-carrier identification, or authentication, is compared with the data derived from the scanned physical properties of the data-carrier to be authenticated.

A method of the above described kind is already known from German AS 26 35 795 in which the data-carrier, e.g. a cheque card, in a processing station is conveyed beneath a sensing device which picks out a trace parallel to the direction of data-carrier movement.

In this manner a plurality of informations is obtained from data-carrier areas which succeed one another in a parallel direction to the direction of data-carrier movement through the station. However, this method raises the problem that the data-carrier must be extremely precisely positioned for each marking or checking pass in order to ensure that precisely the same trace will be scanned for authentication as for the original characteristic marking of the data carrier, which is all the more difficult in view of the fact that the trace should be as narrow as possible.

It is the aim of the present invention to provide a method of the kind specified which dispenses with the need for a precise lateral coordination of the data-carrier region to be evaluated relative to the device which scans this region. It is also the aim of the invention to provide apparatus for the practical application of said method.

The stated aim is achieved by a method of the kind specified which, according to the invention, is characterised in that, for the identification or authentication of a data-carrier, its physical properties are scanned within an area, or region thereof which is larger than the area, or region of this data-carrier which is covered by the characteristic marking, and that the amount of data collected from the larger area during identification is then compared with the amount of data from a smaller area of the data-carrier collected during characteristic marking of the latter and checked for the presence of correlations between the physical properties reflected in these collected data.

The apparatus for practical application of the method according to this invention is characterised in that it comprises a sensing device, or detector, which for the characteristic marking of the data-carrier picks up the physical properties thereof in a first region and for authenticity identification of the data-carrier picks up the physical properties in a second region thereof which second region includes the said first region but is larger than this, and in that an analyser is provided in which the data reflecting physical properties of the data-carrier collected from the said first region and from the said second, larger region, are mutually compared and checked for the presence of correlations between the physical properties which are reflected in these data.

The invention is hereinafter more particularly described with reference to the accompanying drawings showing examples of embodiments and wherein:

FIG. 2 is a diagrammatic representation of the processor; and

FIG. 3 is a matrix of measuring or test points.

Figure 1:
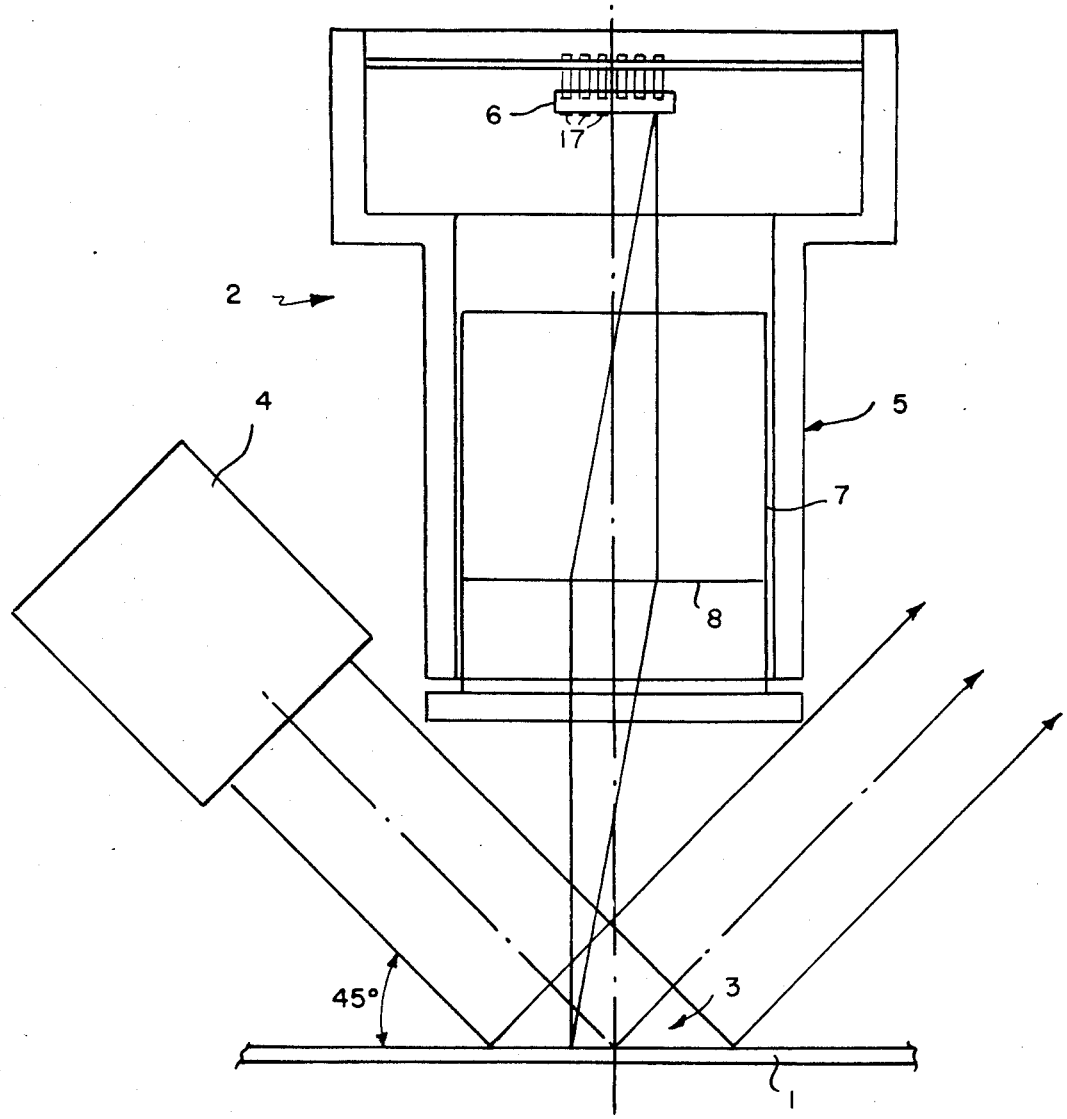
FIG. 1 is a schematic side view of part of the processor apparatus.

Preferably the data-carrier 1 is a personal identification card such as, for instance, a cheque card, credit or access card of the kind currently widely in use. The data-carrier comprises a magnetic trace, not shown, in which data can be recorded. For the physical properties-scan the data-carrier 1 is introduced by a suitable drive means into a terminal 2 in such a manner that the magnetic trace is advanced beneath a scanning-and recording head of the terminal for the "reading" and recording of data in the trace. The drive means and the scanning and recording head are conventional devices and for this reason not shown. FIG. 1 merely shows a section of the terminal viewed at right angles relative to the direction of feed of the data-carrier 1. In the illustrated and described embodiment the physical properties of the data-carrier are optical features of its surface depending on structure, colour and the like. An area, or region 3 of the data-carrier which extends transversely of the direction of feed is illuminated by a laterally arranged light source 4. Preferably this light source 4 is so arranged that the light impinges on the area which is to be illuminated at an angle of approximately 45° relative to the data-carrier surface. A receiver 5 which is rigid with the terminal is provided vertically above the illuminated region 3. This receiver 5 comprises a CCD -photo-scanner line 6 extending transversely of the direction of data-carrier feed. A CCD photo-scanner line contains, for example 256 discreet photo-pick-up elements in a linear array. Each individual pick-up element has a width of, for example, 16 to 18 $\mu$m, and the distance between any two successive elements may be, for example, 4 $\mu$m. In a typical data-carrier card for example the grain size at the card surface will be of the order 10 $\mu$m. Consequently the resolution of the CCD photo-pick-up array 6 very nearly corresponds to the grain size at the surface of conventional data-cards. The receiver 5 further comprises a focussing lens system, or optics 7 characteristically indicated in the drawing by a main plane 8. The imaging optics 7 are so designed that each point of the illuminated region 3 is projected on the CCD -pick-up array 6. The imaging or focussing optics have an adjustable image scale.

As will be observed most clearly from FIG. 2, the serial output of the CCD photo-scanner array 6 is applied to a fast analog-digital-converter 9. The CCD photo-scanner array 6 is further connected to a process controller 10. The process controller in its turn is connected to a control module for direct memory access, known as a DMA controller 11 which is connected on one side to the analog-digital converter 9 and on the other side, via bus-bar 12, to a randon-access memory RAM 13, a read-only memory ROM 14, a central unit 15 and an input-output unit 16. The analog-digital converter 9 is also connected to RAM 13, ROM 14, central unit and input-output unit via busbar 12.

The actual pick-up of physical or optical properties of data-carrier 1 occurs in the following manner: First of all the central unit 15 initiates DMA controller 11 by feeding a basic address into this controller. The DMA controller 11 then continually runs through pre-recorded addresses and compares whether or not it has arrived at the final address specified by the central unit. Through the DMA controller and process controller 10 the photo-scanner array 6 is initially set to its re-set or basic state. The analog signals produced by the individual photo-pick-up elements in the array 6 which signals are proportional to the reflective property of the respectively associated point of the illuminated region 3 projected on the element, are then pushed on towards the serial output terminal of array 6 in a timed cycle which is determined by the process controller. The analog signals which appear at the serial output terminal of array 6 are then converted into digital signals by digital-analog-converter 9. When the analog-signals of all 256 photo-transducer elements have been converted into digital signals the latter are fed into RAM 13. The completed scan of each line comprising, for example, 256 image points, is followed immediately by a scan of the next line which is defined by relative displacement of data-carrier 1 and transducer array 6.

In RAM 13 are at the same time stored the record data which were picked up from the magnetic trace. ROM 14 contains a programme by means of which the record data are now compared with the digital data obtained from the actually scanned optical properties of the data-carrier.

Now, for the characteristic marking of the data-carrier not all of the output signals of the, say 256 photo-transducer elements in the array 6 are used to produce the characterising data but only the signal of one photo-transducer element, or the signals of a selected sequence of adjacent or non-adjacent elements are used for a derivation of characteristic data. The characteristic data thus obtained are then inscribed in the record trace.

If the selected photo-transducer elements are contiguous a strip-like band or track will be affected on the surface of the data-carrier 1 and utilised for the derivation of the characterising data. If the selected photo-transducer elements are not contiguous a surface-area pattern of any desired form may be covered on the surface of the data-carrier 1 to be used for producing the characteristic data, the width of such a pattern being however limited by the length of the array 6. If the area-pattern is not to consist of individual mutually parallel bands extending in the direction of feed of the data-carrier 1, the process controller will be so programmed that, for example in each of respectively successive lines 18,19,20,21 and 22, relatively different transducer elements of the array 6 are used for data derivation. In the example shown in FIG. 3 the selected photo-transducer elements are as follows: in line 18, the fourth element, in line 19 the 5th element, in line 20 the 7th element, in line 21 the 4th and 6th elements, and in line 22 the 3rd and 4th elements. The data of these selected photo-transducer elements are recorded in the magnetic trace of the data-carrier 1 to form the identification record being the result of scanning random optical properties which are characteristic of the data-carrier and which are in each case ascertained in small surface areas thereof not situated on a straight line which is parallel to the direction of data-carrier movement. In FIG. 3 the direction of feed or movement of the data-carrier is indicated by the arrow 23.

For an authenticity identification of the data-carrier the output signals of all, e.g. 256, photo-transducer elements in each line 18, ..., 22, of array 6 are stored in RAM 13. A suitable test programme is then applied to check out whether the matrix which is formed by the plurality of scanning lines 18, ..., 22, contains a quantity of data which agrees with the quantity of data obtained from the record trace. It will be readily appreciated that for this operation it is not a critical condition that the data-carrier should be lined up in precisely the same lateral position as previously. A potentially existing lateral shift in data-carrier position is quite immaterial because it is only the sequence of test points which is critical, not their lateral alignment relative to the matrix or line. Any relative shift of the whole testor checking-point sequence is completely immaterial.

The skilled man is familiar with suitable test programmes. They involve the application of correlation- and signature analysing processes capable of detecting coincident features in two mutually compared sets of data. Mutual agreement or coincidence will be acknowledged if coincidence is ascertained in a predetermined number of comparisons of individual data from both sets. In this kind of analysing process the two stored sets of data which correspond to the two scanned data-carrier regions of relatively different sizes are, as it were, relatively shifted and superimposed in order to detect coinciding data patterns. For further details of this kind of process reference is made to the publication by Wolfgang Wehrmann et al. "Korrelationstechnik" (correlation-techniques), 2nd edition, Expert Verlag.

In a further embodiment of the invention the scanning device is not a linear array 6 but a planar matrix of photo-receiver cells corresponding to the matrix shown in FIG. 3, with lines and blocks or columns of photo-receiver cells. Testing is done as in the above described example, however the data-carrier 1 is no longer displaced relative to the receiver array. Instead the line sequence 18,19, ... 22 is scanned by the plurality of the successive rows or lines of the photo-receiver matrix in a single scan. Evaluation or processing is the same as described for the first example. For the characteristic marking of the data-carrier a predetermined number with a predetermined distribution of image points of the matrix is evaluated and inscribed to form the specific record of authenticity. For checking authenticity a comparison is made as to whether or not the matrix contains a sequence of image points of which the output signals agree with the data arising from the authenticity record. If so, authenticity is confirmed. Any relative lateral displacement of the card remains without consequence because only the relative distribution or spacing of the points is critical.

The above described invention not only achieves the advantage of being able to dispense with precise lateral alignment of the data-carrier relative to the evaluator device but also provides additional security due to the fact that a series or sequence of test points is being evaluated or analysed which is no longer confined to one straight line, which makes it impossible for unauthorised persons to apply the process.

The application of correlation-techniques for checking the authenticity of a data-carrier enables a data-carrier to be correctly identified as the genuine article even if it has been subject to certain deterioration arising from normal handling and usage. The defined criterium of authenticity is a predetermined correlation-coefficient which corresponds to a merely incomplete agreement between the two sets of data which are compared for authenticity identification. This correlation-coefficient is chosen such that normal modifications in the physical properties of the data-carrier caused by normal usage and handling, e.g. scoring, scratching, soiling, bending, cracking etc., will not prevent verification of data-carrier authenticity.

The authenticity record may be inscribed on the data-carrier itself, notably in a magnetic trace provided thereon as hereinbefore described. The data-carrier may also comprise an integrated semiconductor memory in which the record is stored. Furthermore, the authenticity record may be stored at a central point, e.g. in the processor station or terminal or in a central data-processor system.

In order to adjust, that is to say, up-date, the authenticity record in accordance with progressive deterioration due to wear of the data-carrier the authenticity record is freshly recorded and stored preferably after each authenticity verification or identification process.

We claim:

1. A method for the characteristic marking and/or identification of a data carrier which is inserted into a processing station for the purpose of being characteristically marked and identified using data which are specifically characteristic of said data carrier, wherein in marking said data carrier said data are derived from individual physical properties of said data carrier scanned along a detection track in a first region thereof and stored on said data carrier in the form of a protocol, and in identifying said data carrier the individual physical properties thereof are scanned over a second region of said data carrier including and being larger than said first region and comprising a number of detection tracks being disposed parallel adjacent to each other and covering said first detection track, identification data are derived from said scanned individual physical properties of said second region, said data stored on said data carrier are read out and said identification data are compared with said stored data by checking for the presence of correlations between the physical properties represented by said stored data and said identification data.

2. The method of claim 1, wherein said first and second regions of said data carrier are defined by a feed direction of the latter in said processing station and by an extension transversely of this direction of a line-scanner scanning the physical properties, the extension being transverse to the feed direction.

3. The method of claim 2, wherein said line-scanner is a charge-coupled device (CCD) photo-pick-up array.

4. The method of any of claims 1, 2, or 3, wherein for marking said data carrier the physical properties of said data carrier are scanned within a predetermined planar pattern area, within said first region.

5. The method of claim 1, 2, or 3, wherein for marking said data carrier the physical properties of said data carrier are scanned within a random planar pattern area within said first region.

6. Apparatus for the characteristic marking and identification of a data carrier, comprising a processing station in which said data carrier is inserted for characteristic marking and authenticity identification, said processing station comprising scanning means for scanning physical properties of said data carrier along a first detection track in a first region thereof for the characteristic marking process and in a second region thereof for authenticity identification, wherein said second region includes and extends beyond said first region and comprises a number of detection tracks being disposed parallel adjacent to each other and covering said first detection track, and analyser means comparing said data scanned in the marking process and in the identification process and checking said data for the presence of correlations between the physical properties represented by said data.

7. The apparatus of claim 6, wherein said scanning means comprises a CCD photo-line-scanner array and in that drive means are provided for relative displacement of said data carrier and said CCD-photo-line-scanner array, the CCD photo-line scanner being arranged transversely to the direction of data carrier movement.

8. The apparatus of claim 6, wherein the authenticity criterium of a data carrier is a predetermined correlation coefficient which corresponds to an incomplete coincidence between said data compared for identification of said data carrier.

9. The apparatus of claim 8, wherein said correlation coefficient is selected such that normal variations in physical data carrier properties arising from normal use and wear will not prevent authenticity verification of an authentic data carrier.

10. The apparatus of claim 6, wherein said authenticity record is inscribed in said data carrier itself.

11. The apparatus of claim 6, wherein said authenticity record is stored at said processing station.

12. The apparatus of claim 6, wherein said data carrier comprises a semiconductor memory integrated therein.

* * * * *